(12) United States Patent
Idera et al.

(10) Patent No.: US 11,369,999 B2
(45) Date of Patent: Jun. 28, 2022

(54) PARCEL DETERMINATION DEVICE, PARCEL SORTING SYSTEM, AND PARCEL DETERMINATION METHOD

(71) Applicant: PANASONIC INTELLECTUAL PROPERTY MANAGEMENT CO., LTD., Osaka (JP)

(72) Inventors: Takaaki Idera, Kanagawa (JP); Takaaki Moriyama, Kanagawa (JP); Shohji Ohtsubo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 313 days.

(21) Appl. No.: 16/623,638

(22) PCT Filed: May 16, 2018

(86) PCT No.: PCT/JP2018/018942
§ 371 (c)(1),
(2) Date: Dec. 17, 2019

(87) PCT Pub. No.: WO2019/003685
PCT Pub. Date: Jan. 3, 2019

(65) Prior Publication Data
US 2020/0222948 A1    Jul. 16, 2020

(30) Foreign Application Priority Data
Jun. 30, 2017    (JP) .............................. JP2017-129573

(51) Int. Cl.
*B07C 7/00*    (2006.01)
*G06V 10/22*    (2022.01)

(52) U.S. Cl.
CPC .............. *B07C 7/005* (2013.01); *G06V 10/22* (2022.01)

(58) Field of Classification Search
CPC ........ B07C 7/005; B07C 3/00; G06K 9/2054; G06K 7/10; B65G 1/137; G03B 21/14
See application file for complete search history.

(56) References Cited

U.S. PATENT DOCUMENTS 6,812,426 B1 * 11/2004 Kotowski .............. B65G 43/10
                                                198/460.1
7,090,134 B2    8/2006 Ramsager
(Continued)

FOREIGN PATENT DOCUMENTS

| JP | 2008-280102 | 11/2008 |
| JP | 2017-088388 | 5/2017 |
| WO | 2015/145982 | 10/2015 |

OTHER PUBLICATIONS

The Extended European Search Report from the European Patent Office (EPO) dated May 25, 2020 for the related European Application No. 18822804 3.
(Continued)

*Primary Examiner* — Ming Y Hon
(74) *Attorney, Agent, or Firm* — Greenblum & Bernstein, P.L.C.

(57) ABSTRACT

There is provided a parcel determination device that determines whether or not parcel recognized in a first recognition region provided in a predetermined transport path and parcel recognized in a second recognition region being disposed on a downstream side from the first recognition region in the transport path and being discontinuous with the first recognition region are the same parcel, the device including: a processor; and a memory, in which by cooperating with the memory, the processor determines whether or not parcel which leaves the first recognition region and parcel which enters the second recognition region are the same parcel, based on whether or not a time when parcel leaves the first recognition region and a time when parcel enters the second
(Continued)

recognition region correspond to a time required for parcel to be transported between the two recognition regions.

16 Claims, 8 Drawing Sheets

(56) References Cited

U.S. PATENT DOCUMENTS

| | | | | |
|---|---|---|---|---|
| 2003/0046904 A1* | 3/2003 | Goodman | ............... | B65B 5/105 |
| | | | | 53/448 |
| 2004/0195320 A1* | 10/2004 | Ramsager | ................ | B07C 3/20 |
| | | | | 235/385 |
| 2009/0114575 A1* | 5/2009 | Carpenter | ............... | B07C 7/005 |
| | | | | 209/584 |
| 2013/0251098 A1* | 9/2013 | Morton | ................ | G01N 23/046 |
| | | | | 378/10 |
| 2014/0096900 A1* | 4/2014 | Wojdyla | .................... | B65C 9/02 |
| | | | | 156/247 |
| 2015/0285906 A1* | 10/2015 | Hooper | .................. | G01S 7/412 |
| | | | | 342/21 |
| 2017/0066597 A1* | 3/2017 | Hiroi | ....................... | B65G 15/00 |
| 2017/0313421 A1* | 11/2017 | Gil | ............................ | B64F 1/32 |
| 2018/0204030 A1* | 7/2018 | Bruce | .............. | G06K 19/07758 |
| 2019/0042847 A1* | 2/2019 | Suzuki | .................. | G09G 5/373 |
| 2021/0192451 A1* | 6/2021 | Tazume | ........... | G06Q 10/08355 |

OTHER PUBLICATIONS

International Search Report (ISR) from International Searching Authority (Japan Patent Office) in International Pat. Appl. No. PCT/JP2018/018942, dated Aug. 7, 2018.

* cited by examiner

PARCEL DETERMINATION DEVICE, PARCEL SORTING SYSTEM, AND PARCEL DETERMINATION METHOD

TECHNICAL FIELD

The present disclosure is related to a parcel determination device, a parcel sorting system, and a parcel determination method useful to sort parcel.

BACKGROUND ART

As recent economic activity rises, the amount of parcel circulation tends to increase. In a circulation process of parcels, sorting work for sorting the parcel by destination is a time-consuming process and relies on manual work from before, but a technology of automating at least a part of the sorting work is proposed.

PTL 1 discloses a system in which moving parcel is tracked, an image to be displayed is determined based on information related to the parcel read from the parcel and information of a position of the parcel, and the image is projected from a projector to display the image on the parcel.

CITATION LIST

Patent Literature

PTL 1: U.S. Pat. No. 7,090,134

SUMMARY OF THE INVENTION

Technical Problem

However, in recent years, the amount of parcel circulation has been increased more and more and types of parcel have also become various, so that a technology of effectively and precisely sorting the parcel is required.

The present disclosure is related to the technology of effectively and precisely sorting the parcel.

Solutions to Problem

According to the present disclosure, there is provided a parcel determination device that determines whether or not parcel recognized in a first recognition region being provided in a predetermined transport path and parcel recognized in a second recognition region disposed on a downstream side from the first recognition region in the transport path and being discontinuous with the first recognition region are the same parcel, the device including: a processor; and a memory, in which by cooperating with the memory, the processor determines whether or not parcel which leaves the first recognition region and parcel which enters the second recognition region are the same parcel, based on whether or not a time when parcel leaves the first recognition region and a time when parcel enters the second recognition region correspond to a time required for parcel to be transported between the two recognition regions.

According to the present disclosure, there is provided a parcel sorting system including: a projection instruction device including the parcel determination device described above; a label reader which reads parcel identification information from a label attached to parcel; a plurality of image sensors which obtain an image including parcel; and an image projection device which projects a projection image indicating a sorting destination on the parcel.

According to the present disclosure, there is provided a parcel determination method of determining whether or not parcel recognized in a first recognition region provided along a predetermined transport path and parcel recognized in a second recognition region disposed on a downstream side from the first recognition region along the transport path and discontinuous with the first recognition region are the same parcel, the method including: by causing a processor to cooperate with a memory, determining whether or not parcel which leaves the first recognition region and parcel which enters the second recognition region are the same parcel, based on whether or not a time when parcel leaves the first recognition region and a time when parcel enters the second recognition region correspond to a time required for parcel to be transported between the two recognition regions.

According to the present disclosure, it is possible to more effectively and precisely sort the parcel and to further deal with an increase in the amount of parcel circulation. Specifically, in a case where a plurality of recognition regions are set in a transport direction of parcel, even if there are two discontinuous recognition regions, it is possible to determine whether or not parcel recognized in an upstream recognition region and parcel recognized in a downstream recognition region in these recognition regions are the same, and it is possible to prevent tracking accuracy of parcel from deteriorating.

DESCRIPTION OF EMBODIMENTS

Hereinafter, embodiments (hereinafter, referred to as "present embodiment") which specifically disclose a parcel determination device, a parcel sorting system, and a parcel determination method according to the present disclosure will be described in detail with reference to appropriate drawings. However, in some cases, an unnecessarily detailed explanation may be omitted. For example, in some cases, a detailed explanation of already well-known items and a repetition explanation of substantially the same configuration may be omitted. This is to avoid unnecessary repetition of the following description and to facilitate understanding by those skilled in the art. The accompanying drawings and the following description are provided to enable those skilled in the art to fully understand the present disclosure and are not intended to limit a scope of the claims.

Hereinafter, the embodiments of the disclosure will be described with reference to FIGS. 1 to 8.

[Configuration]

Figure 1:
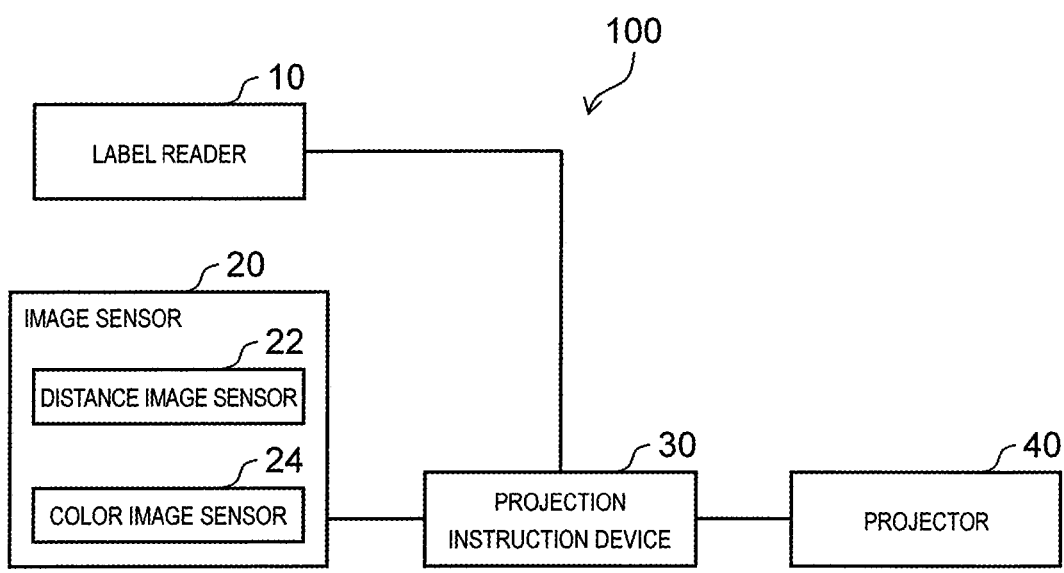
FIG. 1 is a block diagram illustrating a configuration of a parcel sorting system according to an embodiment.

FIG. 1 is a block diagram illustrating a configuration of the parcel sorting system according to the embodiment. Parcel sorting system 100 illustrated in FIG. 1 is installed in, for example, a distribution center. Parcel sorting system 100 includes label reader 10, image sensor 20, projection instruction device 30, and projector 40. Parcel sorting system 100 is a system which supports work of a worker who sorts parcel transported by a transport conveyor. Parcel sorting system 100 is installed at the distribution center owned by, for example, a retailer, a wholesaler, an internet distributor, or the like. Parcel to be sorted generally has an approximately rectangular parallelepiped shape, but the outward shape of the parcel is not particularly limited, and a type of the parcel is also not particularly limited. The configuration of the parcel sorting system is not limited to the configuration illustrated in FIG. 1. For example, one label reader 10 may be connected with a plurality of image sensors 20, a plurality of projection instruction devices 30, and a plurality of projectors 40. The number of each component can be appropriately modified according to the purpose.

Label reader 10 as a reading device is a device which includes various components such as a lens (not illustrated), an image sensor, and the like. By using label reader 10, it is possible to read label recording information including various types of information related to the parcel from a label attached to the parcel transported by the transport conveyor. By using the read label recording information, it becomes possible to specify the parcel. By the read information, parcel identification information is defined.

Image sensor 20 is an imaging device which includes various components such as a lens (not illustrated), an image sensor, and the like. Image sensor 20 is generally configured by an imaging camera. The imaging camera is a three-dimensional camera, a plurality of two-dimensional cameras, or the like. Image sensor 20 includes distance image sensor 22 and color image sensor 24.

Distance image sensor 22 images the parcel transported by the transport conveyor and generates a distance image. The generated distance image is used as information indicating a position of the parcel, a distance to the parcel, a size of the parcel, and the like. "Distance image" means an image including distance information indicating a distance from an imaging position to a position (including a surface of parcel) indicated by each of pixels (that is, "image" in the present disclosure includes a distance image). In addition, a term of "distance image" includes one which cannot be recognized as an image by human eyes, such as a table or the like listing numerical values indicating a distance. That is, "distance image" may be information indicating a relationship between coordinates and a distance in the imaged region, and a data structure is not limited thereto. In the present disclosure, distance image sensor 22 is used for specifying the position of the parcel. Therefore, distance image sensor 22 also can be replaced with another sensing device (an ultrasonic sensor, an infrared sensor, a stereo camera, and a monocular video camera).

Color image sensor 24 images parcel generated by the distance image and generates a color image. "Color image" refers to an image in which a color of a surface of parcel is expressed with a predetermined gradation, and the "gradation" includes not only 256 gradations of RGB but also all kinds of grayscales or the like. Color image sensor 24 in the present disclosure is used for tracking each parcel, for the parcel specified by distance image sensor 22. Color image sensor 24 also can be replaced with another sensing device (an ultrasonic sensor, an infrared sensor, a stereo camera, and a monocular video camera).

That is, in the present disclosure, a term of "image" includes both of a distance image and a color image. In the present disclosure, information output from an image sensor as a sensing device including a distance image sensor and a color image sensor is referred to as sensing information. In the present embodiment, an example of the sensing device will be described by using image sensor 20 (including distance image sensor 22 and color image sensor 24). In addition, in the present embodiment, an example of the sensing information will be described by using a distance image output by distance image sensor 22 and a color image output by color image sensor 24.

Figure 2:
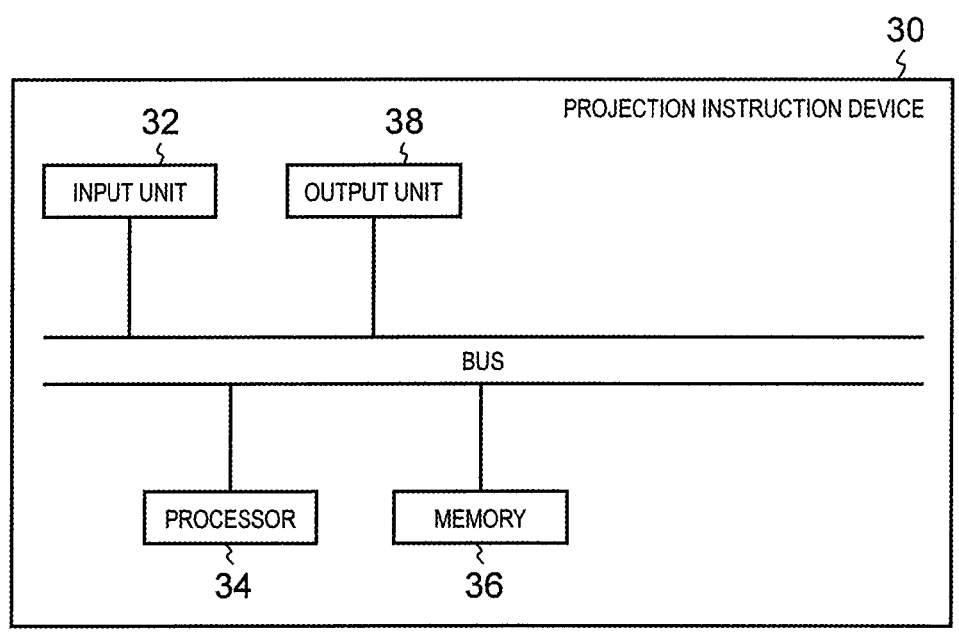
FIG. 2 is a block diagram illustrating a configuration of a projection instruction device according to the embodiment.

Projection instruction device 30 functions as a calculation device in parcel sorting system 100. As illustrated in FIG. 2, projection instruction device 30 includes input unit 32, processor 34, memory 36, and output unit 38 connected with one another via a bus. Input unit 32 receives parcel identification information for specifying parcel obtained from the label recording information read by label reader 10, a distance image generated by distance image sensor 22, and a color image generated by color image sensor 24. Processor 34 is configured by a general calculation device and generates a projection image to be projected on parcel based on the parcel identification information, the distance image, and the color image. Memory 36 as a storage device reads a control program necessary for various processes by processor 34 and performs an operation such as data backup. That is, processor 34 and memory 36 control various processes by projection instruction device 30 by cooperating with each other. Output unit 38 outputs the projection image generated by processor 34 to projector 40. In the present disclosure, "processor" does not mean only a single processor. "Processor" means an operator having a plurality of processors having an identical purpose, or a plurality of processors having different purposes in a case where they perform processes in collaboration with one another (for example, general-purpose central processing unit (CPU) and a graphic processing unit (GPU)).

Projector 40 is configured by a general projection device, and projects projection light including the projection image received from projection instruction device 30, on the parcel and displays the projection image onto the parcel.

Parcel sorting system 100 can be configured to include label reader 10, image sensor 20 (distance image sensor 22 and color image sensor 24), projection instruction device 30, and projector 40 connected with one another in wired communication or in wireless communication. In addition, parcel sorting system 100 also can be configured to include two or more devices of any of label reader 10, image sensor 20, projection instruction device 30, and projector 40 as an integral device. For example, image sensor 20 and projector 40 can be combined to construct an integral imaging projection device (see FIG. 3A).

[Outline of System]

Figure 3A:
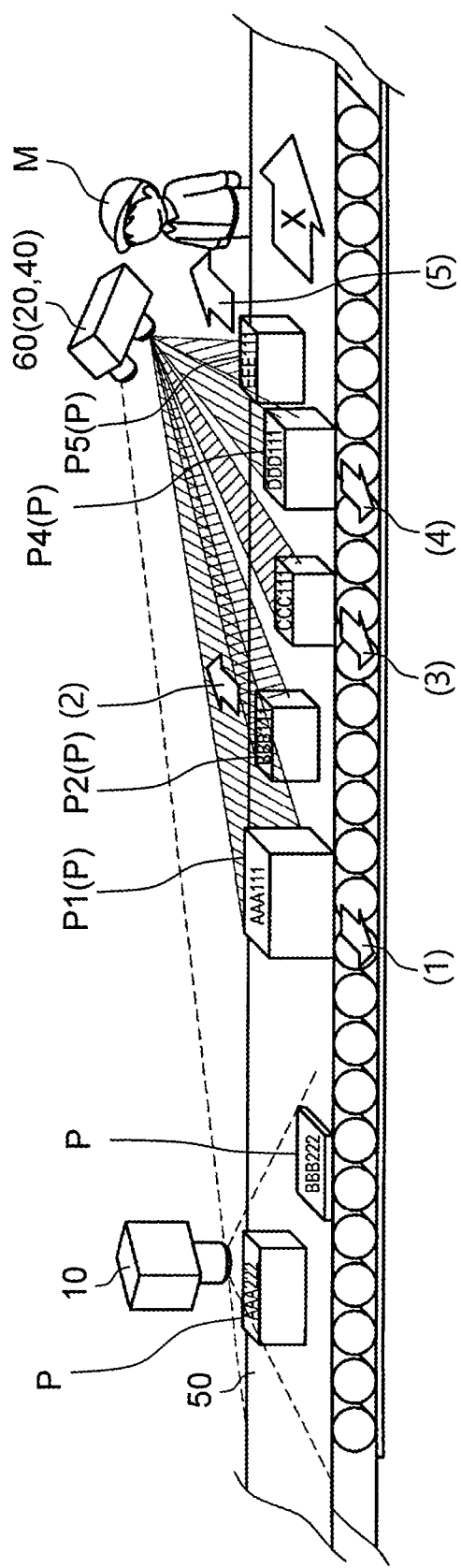
FIG. 3A is a conceptual diagram illustrating a status in which the parcel sorting system is installed in a distribution center and is in operation.

FIG. 3A is a conceptual diagram illustrating a status in which parcel sorting system 100 is installed in the distribution center and is in operation. In the related art, each of workers M visually checks the label attached to each parcel P transported by transport conveyor 50 in the arrow X-direction. When the parcel to be delivered by the worker himself arrives, worker M needs to pick up the parcel and place the parcel once in the vicinity such as the worker's own feet, a basket, a truck bed. However, in a case of visually sorting by the worker, there is a limit in work efficiency of the worker, so that it is necessary to limit a transport speed to a predetermined value or less. As a result, a limit value of the amount of parcel which the worker can sort in a unit time, was few. In addition, due to an erroneous recognition when the worker visually checks the label, there is a possibility that an error may occur at the time of sorting. In recent years, the amount of parcel circulation has increased, and these problems receive more attention.

In the present embodiment, as illustrated in FIG. 3A, label reader 10 disposed above transport conveyor 50 reads the label attached to each parcel P transported by transport conveyor 50. In the label, the label recording information including various information related to the parcel is described. The label recording information includes information similar to a parcel identification number individually assigned to the parcel, a name, an address, and a telephone number of a sender, a name, an address, and a telephone number of a receiver, a parcel type, and the like. The label may be read by the worker in charge by manually placing a barcode reader as label reader 10 to a barcode in the label.

Further, image sensor 20 images the image (the distance image and the color image) of parcel P transported by transport conveyor 50 and obtains information such as a position of parcel P, a distance to parcel P, a size (lengths of three sides when parcel P is rectangular parallelepiped) of parcel P, a color of parcel P, a pattern of parcel P, and the like. Further, positions of label reader 10 and image sensor 20, a type of the sensing device, and an order of processes are not particularly limited to the illustrated embodiments. As described above, in the present example, image sensor 20 and projector 40 are configured as an integrated imaging projection device 60 and are disposed above transport conveyor 50.

Projection instruction device 30 (not illustrated in FIGS. 3A and 3B) is configured by a computer disposed in, for example, the vicinity of transport conveyor 50 or another room and generates the projection image to be displayed on parcel P (for example, upper surface when parcel P is rectangular parallelepiped) based on the information, obtained by label reader 10, specifying the parcel and the distance image and the color image generated by image sensor 20. Projection instruction device 30 transmits a projection instruction to project the projection image on parcel P, to projector 40.

Figure 3B:
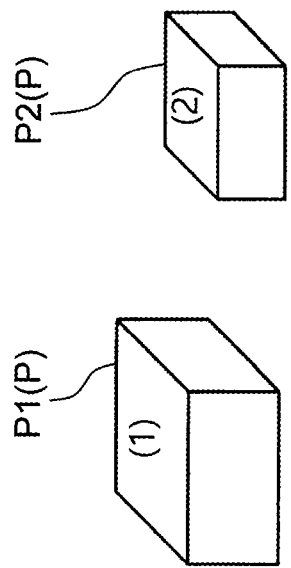
FIG. 3B is a diagram illustrating a state in which a projection image including a number is projected on an upper surface of parcel.
Figure 4:
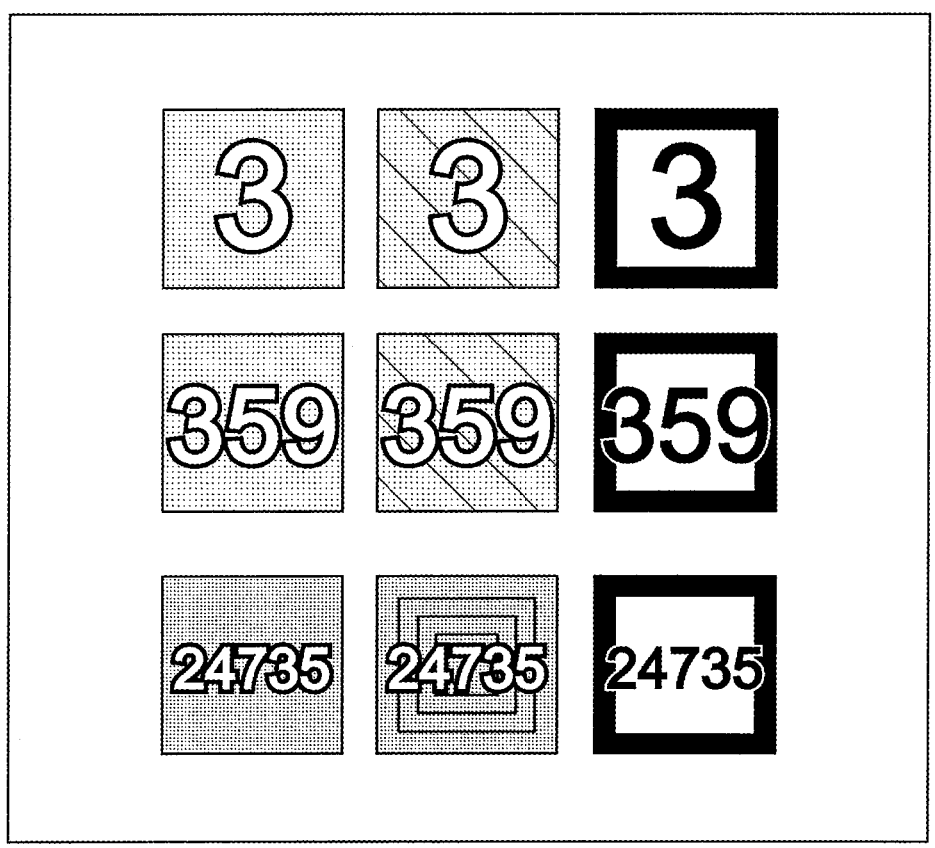
FIG. 4 is a diagram illustrating an example of a projection image generated by the projection instruction device according to the embodiment.

Projector 40 which receives the projection instruction, as an image projection device, projects projection light including the projection image generated by projection instruction device 30 on parcel P and displays the projection image on parcel P. Here, the projection image displayed on parcel P is, for example, an image of an encircled number having a color indicating a sorting location corresponding to a delivery address of parcel P (see FIG. 3B). Here, the encircled number corresponds to, for example, a number of a truck carrying sorted parcel P (a number of the truck itself, a parking lot number, or the like), a number of a shelf or a box to be carried into the truck, or the like. Further, instead of directly corresponding to the number such as the shelf or the box, the encircled number may correspond to a number of a shooter which moves the picked-up parcel to another location or a truck. Since a parking position of the truck or the like frequently changes according to a traffic condition or the like, it may be difficult to correspond to the sorting destination viewed from the periphery of transport conveyor 50 at any time. Therefore, the shooter is sandwiched between transport conveyor 50 and the transport truck, and a number of the shooter is projected on the periphery of transport conveyor 50, so that even if a configuration on the periphery of the transport conveyor 50 is not changed as needed, it is possible to deal with the change of the sorting destination by disposing an opening of the shooter. Certainly, according to a status, various types of projection images are displayed. Another example of displaying the number may be a zip code corresponding to the delivery address, a number of a worker who picks up parcel P, or the like. In addition, as an example of displaying information other than the number, an arrow indicating the sorting direction (such as right or left in a transport direction of transport conveyor 50) or characters (such as "left" and "right") may be used. Further, a display form is not limited to the encircled number, and various types such as numbers surrounded by squares ("3", "359", and "24735") as illustrated in FIG. 4 are conceivable. Furthermore, the projection image is not limited to numbers or characters enclosed with a frame, but may be white numbers or characters with a solid background. In addition, the shape of the number or character to be displayed such as a circle, a triangle, a square, or the like may be switched according to information to be displayed. Further, a picture capable of being individually associated with each information to be displayed may be displayed. The projection image is not limited to a still image, and may be an animation. As an example of the animation, the example described above may be blinked, enlarged or reduced, and a color may be changed. An animation reflecting the sorting direction may be projected. An example of the animations reflecting the sorting direction may include various patterns, for example, a moving light ray or light spot in the sorting direction, forming all or a part of the projection image in the sorting direction, changing the color of the projection image in the sorting direction, and displaying an arrow moving in the sorting direction, and the like. In a case where only a part of the projection image is a target of the animation, a part having a large influence on determination of the sorting destination by a worker, such as a number, an arrow, or the like, may be not changed, and a part not affected by the sorting destination such as a frame line may be changed. Meanwhile, in a situation in which it is more efficient to convey the sorting direction more intuitively than the meaning of the number or the like projected within the frame line, such as a case where there are few options for the sorting destination, a number, an arrow, or the like may be moved in the sorting direction within a fixed frame. The animation may be repeatedly projected or may be projected only once. In the present disclosure, "image projection device" is not limited to a device which directly projects a light beam on the parcel. In the present disclosure, "image projection device" includes glasses which can display the image. That is, in the present disclosure, in a case of expressing as projecting projection light on the parcel, displaying the image on the parcel, projecting the image on the parcel, or the like, the expression also includes allowing the worker to recognize the image via the glasses capable of displaying the image in a pseudo manner as if the projection light is projected on the parcel. That is, in a case where the worker wears special glasses capable of displaying the image, the projection image of parcel P may be superimposed on the image of parcel P viewed via the glasses.

In FIG. 3A, worker M (omitted for other workers) in charge of picking up the parcel stands beside transport conveyor 50 and the parcel arriving each region is picked up from transport conveyor 50 as indicated by encircled number 1, encircled number 2, encircled number 3, or the like.

For example, parcel P1 has parcel identification information of "AAA111" on a label, and the parcel identification information of "AAA111" specifies that the parcel is a target to be sorted in region A. Here, when parcel P1 reaches the specific region, processor 34 transmits the generated projection image to projector 40 as illustrated in FIG. 3B. Projector 40 projects the projection image on parcel P1. The worker in the region can easily pay attention to parcel P1, to be picked up by the worker, which reaches the specific region of the worker, accordingly, the parcel can be sorted more efficiently and precisely.

In the present embodiment, as illustrated in FIG. 3A, whether or not one projector 40 projects the image on a plurality of specific regions may be switched and whether or not a plurality of projectors 40 project the image on each of the specific regions may be switched.

Hereinafter, in parcel sorting system 100 according to the embodiment, an outline of an operation of sorting the parcel performed by projection instruction device 30 will be described.

[Outline of Operation]

Figure 5:
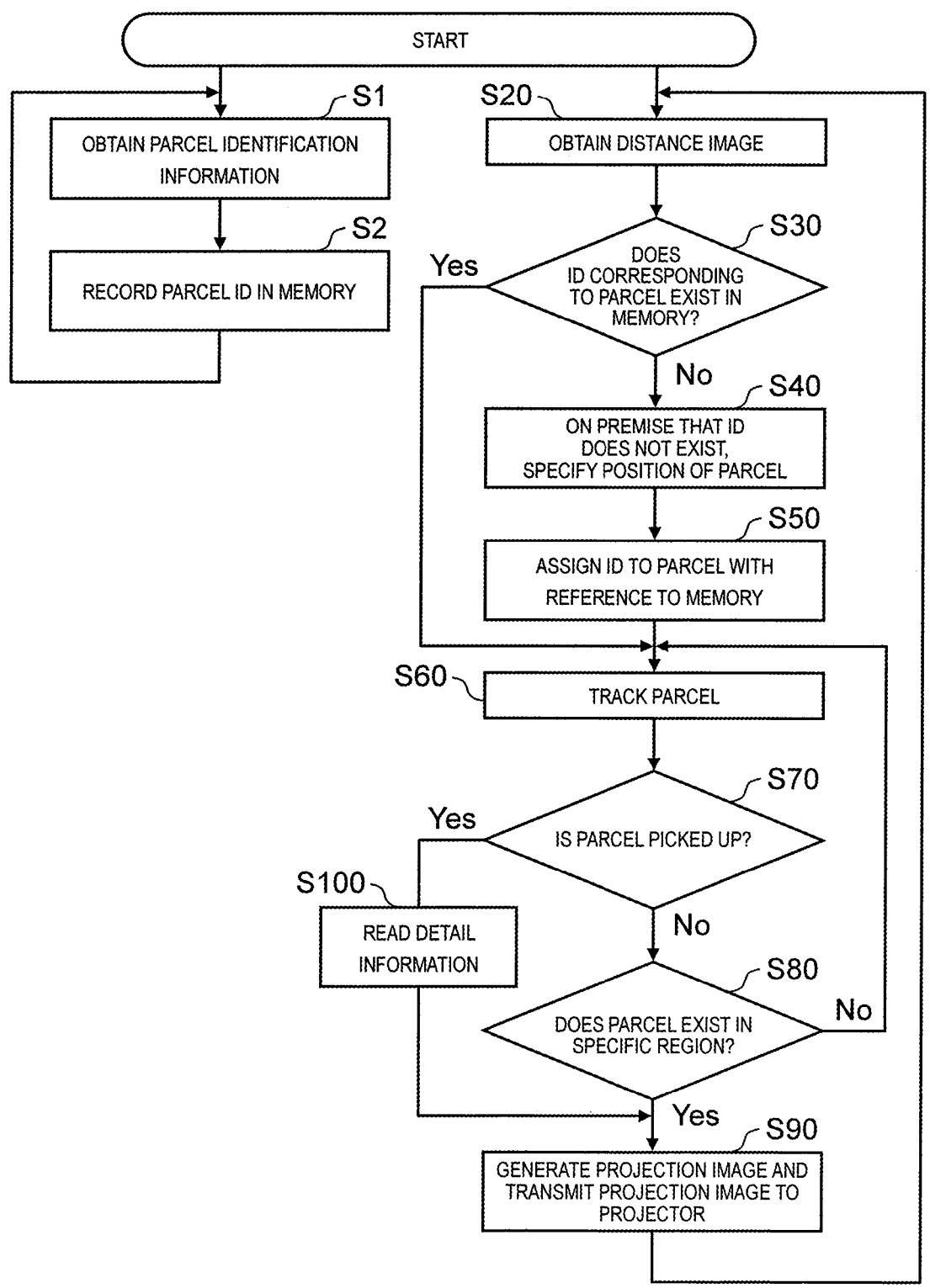
FIG. 5 is a flowchart illustrating an outline procedure of an operation mainly performed by the projection instruction device.

FIG. 5 is a flowchart illustrating an outline procedure of an operation of mainly performed by projection instruction device 30 of the present embodiment, particularly processor 34 of projection instruction device 30. First, after label reader 10 reads the label recording information of the label of the parcel, input unit 32 of projection instruction device 30 obtains the parcel identification information corresponding to the label recording information from label reader 10 (step S1). The parcel identification information is information including at least one piece of information similar to the parcel identification number individually assigned to the parcel, the name, the address, and the telephone number of the sender, the name, the address, and the telephone number of the receiver, the parcel type, and the like. For the parcel identification information, processor 34 assigns an ID as a parcel identification number specifying the parcel and records the ID and time information corresponding to a time at which the ID is assigned, in memory 36 (step S2). The ID recorded in memory 36 may be the parcel identification number originally recorded in the parcel identification information or may be assigned by projection instruction device 30 generating a new ID.

On the other hand, in parallel with step S1 and step S2, after distance image sensor 22 of image sensor 20 images the distance image of the parcel, input unit 32 of projection instruction device 30 obtains the distance image as the sensing information from distance image sensor 22 (step S20). Processor 34 determines whether or not the ID corresponding to the parcel existing in the distance image exists in memory 36.

An example of a method of determining whether or not the ID corresponding to the parcel existing in the distance image exists in memory 36 is as follows. That is, processor 34 calculates a time required for the parcel to move between label reader 10 and distance image sensor 22 by a distance (assumed to be known) between label reader 10 and distance image sensor 22 and a speed of transport conveyor 50. By subtracting the time from a time when the distance image is obtained, a time when the ID is assigned to the parcel existing in the distance image by label reader 10 (or processor 34) can be estimated. It can be estimated that the ID assigned close to the estimated time is the ID corresponding to the parcel existing in the distance image. In addition, as another example, a method of installing another distance image sensor in the vicinity of label reader 10 may be possible. That is, by tracking the parcel, to which the ID is assigned, by using another distance image sensor installed in the vicinity of label reader 10 since label reader 10 assigns the ID (or processor 34), a distance between the parcel (or the ID) and label reader 10 is measured for a time unit. Processor 34 can estimate the ID of the parcel in the distance image obtained in a predetermined step S20 by the measured distance between the parcel (or the ID) and label reader 10, a distance of the parcel in the distance image obtained in step S20, and a distance (assumed to be known) between two distance image sensors.

In this way, processor 34 determines whether or not the ID corresponding to the parcel included in the distance image exists in memory 36 (step S30). That is, as described in step S2, in memory 36, the parcel identification information, the ID, and the time information corresponding to a time when the ID is assigned are recorded in advance. On the other hand, as described above, for example, processor 34 subtracts the time required for the parcel to move between label reader 10 and distance image sensor 22 from the time when the distance image is obtained, a time when the ID is assigned to the parcel existing in the distance image by label reader 10 (or processor 34) can be estimated. Processor 34 compares the time information recorded in memory 36 in advance and the estimated time. In a case where the time information is close to the estimated time (for example, a case where a time difference is equal to or smaller than a predetermined time), processor 34 can determine that the ID corresponding to the parcel included in the distance image exists in memory 36. In a case where it is determined that the ID corresponding to the parcel exists in memory 36 (Yes in step S30), the process moves to step S60 and subsequent steps.

In a case where it is determined that the ID corresponding to the parcel does not exist in memory 36 (No in step S30), on the premise that the ID is not assigned to the parcel, processor 34 specifies the position of the parcel again (step S40) and assigns the ID to the parcel (step S50).

In parallel with the above steps, color image sensor 24 generates a color image for each parcel of which a distance image is obtained. Processor 34 tracks the parcel, to which the ID is attached, transported and moved by transport conveyor 50 based on the color image from color image sensor 24 obtained by input unit 32 (step S60). Based on the color image likewise, processor 34 determines whether or not the worker picks up the tracked parcel (step S70). In a case where it is determined that the parcel is not picked up by the worker (No in step S70), processor 34 determines whether or not the parcel exists in a specific region (a predetermined region in which parcel is to be picked up) described below. In a case where it is determined that the parcel exists (reaches) in the specific region (Yes in step S80), processor 34 generates the projection image and transmits the projection image to projector 40 (step S90). In a case where it is not determined that the parcel exists (reaches) in the specific region (No in step S80), the process returns to step S60 and processor 34 continues to track the parcel.

In addition, in step S70, in a case where it is determined that the parcel is picked up by the worker (Yes in step S70), processor 34 reads detail information of the parcel from memory 36 (step S100), generates the projection image including the detail information, and outputs the projection image generated by output unit 38, to projector 40 (step S90). Projector 40 which obtains the projection image from projection instruction device 30, projects the projection image on the corresponding parcel.

The above is the outline of the operation procedure performed by processor 34 and the like of projection instruction device 30. Of course, the operation procedure is not limited to that described above. For example, the determination in step S70 can be omitted. In addition, for the determination in step S70, it is possible to use contact determination between a hand of the worker and the parcel, a color image, a distance image, or the like. Hereinafter, further detailed procedures of each process will be described.

[Parcel Tracking in Case of Two Discontinuous Recognition Regions]

In a case of recognizing and tracking parcel transported by transport conveyor 50 (a transport path), plurality of image sensors 20 are usually used. FIGS. 3A and 3B illustrate one image sensor 20, but only a recognition region of one image sensor 20 cannot recognize and track parcel in entire transport conveyor 50, so that a plurality are actually used.

In a case where plurality of image sensors 20 are disposed along a parcel transport direction in transport conveyor 50, in order to track parcel with high accuracy, it is desirable to arrange recognition regions of image sensors 20 to be continuous. Meanwhile, in some cases, there is a location at which the recognition region is discontinuous due to restrictions on installation positions of image sensors 20. When there are two discontinuous recognition regions in a plurality of recognition regions, since it is unclear whether or not parcel recognized in an upstream recognition region and parcel recognized in a downstream recognition region in these recognition regions are the same, there is a possibility that tracking with high accuracy cannot be performed.

In the present disclosure, in step S60 in FIG. 5, an input and an output of parcel between two discontinuous recognition regions is managed and a time and position information between the input and the output are handed over, so that it is possible to track the parcel even in the two discontinuous recognition regions.

Figure 6:
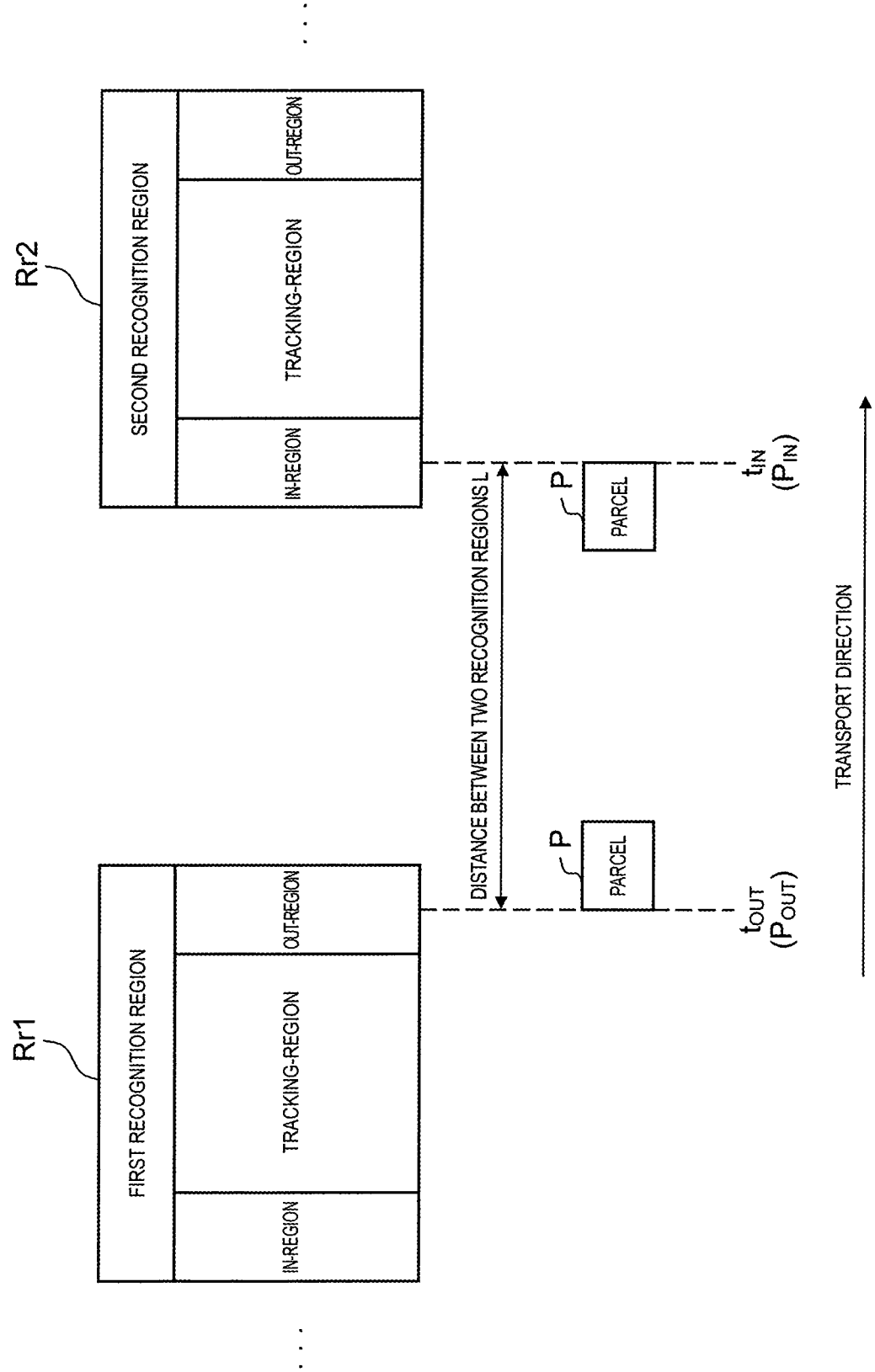
FIG. 6 is a diagram illustrating a recognition and tracking process of parcel in a case of two discontinuous recognition regions.

FIG. 6 is a diagram illustrating a recognition and tracking process of parcel in a case of two discontinuous recognition regions. As illustrated in FIG. 6, each of first and second recognition regions Rr1 and Rr2 is configured to include an in-region, a tracking-region, and an out-region. In this case, the in-region is a region for detecting that parcel enters a recognition region, the out-region is a region for detecting that the parcel leaves the recognition region, and the tracking-region is a region for tracking the parcel. First recognition region Rr1 is on an upstream side of transport conveyor 50, and second recognition region Rr2 is on a downstream side. Parcel P transported by transport conveyor 50 passes through first recognition region Rr1, and then passes through second recognition region Rr2.

Processor 34 detects that parcel P leaves first recognition region Rr1 at a center of the out-region of first recognition region Rr1, and parcel P enters second recognition region Rr2 at a center of the in-region of second recognition region Rr2. Processor 34 stores time $t_{OUT}$ and position information $P_{OUT}$ when parcel P leaves first recognition region Rr1 in memory 36, and when detecting that parcel P enters second recognition region Rr2, processor 34 calculates time $t_{OUT}'$ when parcel P leaves first recognition region Rr1, from time $t_{IN}$ at that time and distance (a distance between two recognition regions) L between first and second recognition regions Rr1 and Rr2. In this case, when calculating time $t_{OUT}'$ when parcel P leaves first recognition region Rr1, processor 34 uses a transport speed of parcel P (that is, a transport speed of conveyance conveyor 50).

After calculating time $t_{OUT}'$ when parcel P leaves first recognition region Rr1, based on calculated time $t_{OUT}'$, processor 34 calculates position information $P_{OUT}'$ when parcel P leaves first recognition region Rr1 from a position of parcel P in second recognition region Rr2. Thereafter, processor 34 compares calculated position information $P_{OUT}'$ with position information $P_{OUT}$ stored in advance, and determines whether or not the parcels are the same. If calculated position information $P_{OUT}'$ and stored position information $P_{OUT}$ are the same within a predetermined error range, it is determined that the parcels are the same. In this manner, it can be determined whether or not parcels P which pass through first and second recognition regions Rr1 and Rr2 are the same, and tracking accuracy of parcel can be prevented from deteriorating.

Figure 7:
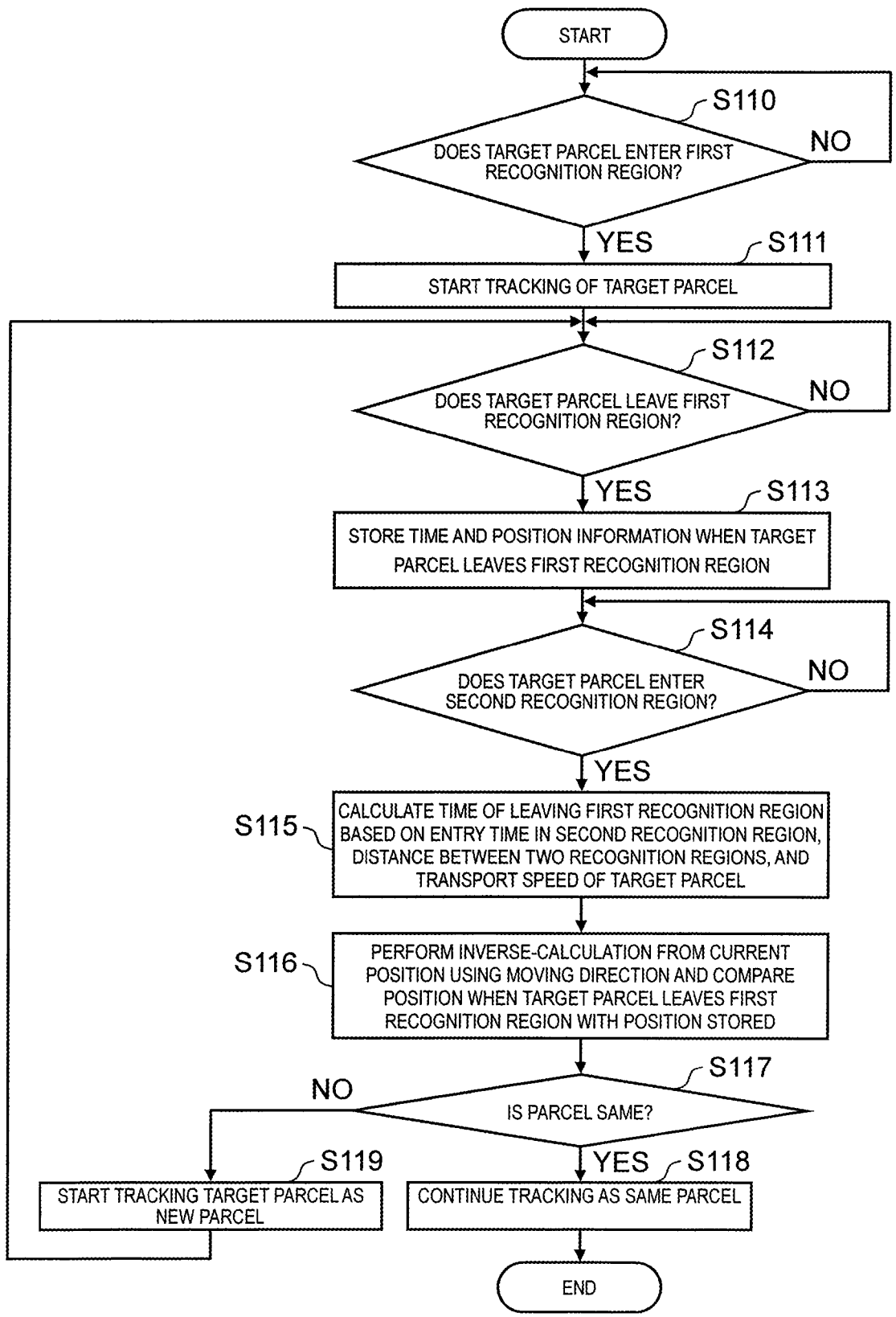
FIG. 7 is a flowchart illustrating an outline procedure of the recognition and tracking process of the parcel in a case of two discontinuous recognition regions.

FIG. 7 is an example of a flow corresponding to the process described above. The flow illustrated here indicates the detailed process in step S60 in the flowchart of the outline procedure in FIG. 5.

Processor 34 first determines whether or not parcel P to be tracked (referred to herein as "target parcel") P enters first recognition region Rr1 (step S110). In a case where it is determined that target parcel P does not enter first recognition region Rr1 (NO in step S110), processor 34 repeats this determination process until it is determined that target parcel P enters first recognition region Rr1. In a case where it is determined that target parcel P is in first recognition region Rr1 (YES in step S110), processor 34 starts tracking of target parcel P (step S111).

After starting the tracking of target parcel P, processor 34 determines whether or not target parcel P leaves first recognition region Rr1 (step S112). In a case where it is determined that target parcel P does not leave first recognition region Rr1 (NO in step S112), processor 34 repeats this determination process until it is determined that target parcel P leaves first recognition region Rr1. In a case where it is determined that target parcel P leaves first recognition region Rr1 (YES in step S112), processor 34 stores time $t_{OUT}$ and position information $P_{OUT}$ when target parcel P leaves first recognition region Rr1 (step S113). That is, they are stored in memory 36.

After storing time $t_{OUT}$ and position information $P_{OUT}$ when target parcel P leaves first recognition region Rr1, processor 34 determines whether or not target parcel P enters second recognition region Rr2 (step S114). In a case where it is determined that target parcel P does not enter second recognition region Rr2 (NO in step S114), processor 34 repeats this determination process until it is determined that target parcel P enters second recognition region Rr2. In a case where it is determined that target parcel P enters second recognition region Rr2 (YES in step S114), processor 34 calculates a time of leaving first recognition region Rr1 based on an entry time in second recognition region Rr2, distance L between two recognition regions, and a transport speed of target parcel P (step S115). Distance L between two recognition regions which is a distance between first recognition region Rr1 and second recognition region Rr2 is stored in memory 36 in advance, and processor 34 reads distance L from memory 36 when calculating a time when target parcel P leaves first recognition region Rr1.

After calculating the time when target parcel P leaves first recognition region Rr1, processor 34 performs inverse-calculation from a current position using a moving direction, compares position information $P_{OUT}'$ when target parcel P leaves first recognition region Rr1 with position information $P_{OUT}$ stored in memory 36 (step S116), and determines whether or not the parcels are the same (step S117). In a case where it is determined that the parcels are the same (YES in step S117), processor 34 continues tracking as the same parcel (step S118), and terminates the present process. In a case where it is determined that the parcels are not the same (NO in step S117), processor 34 starts tracking target parcel P as new parcel (step S119). Next, after returning to step S112, processor 34 determines whether or not target parcel P leaves first recognition region Rr1 as new parcel. Thereafter, the process is performed as described above.

As described above, processor 34 generates a projection image for parcel P to be tracked, and output unit 38 outputs the generated projection image to projector 40. For example, red encircled number 1, green encircled number 2, or blue encircled number 3 is projected on each parcel P to be tracked.

As described above, according to the present disclosure, in a case where plurality of image sensors 20 are disposed in a transport direction of transport conveyor 50, even if there are two discontinuous recognition regions among recognition regions of plurality of image sensors 20, it is possible to determine whether or not parcel recognized in an upstream recognition region and parcel recognized in a downstream recognition region in these recognition regions are the same, and it is possible to prevent tracking accuracy of parcel from deteriorating.

Although the embodiment of a parcel determination device, a parcel sorting system, and a parcel determination method according to the present disclosure is described with reference to the drawings, the present disclosure is not limited to such an example. Those skilled in the art can conceive various modification examples, change examples, substitution examples, addition examples, deletion examples, and equivalent examples within the scope described in the claims and these rightly belong to the technical scope of the present disclosure.

For example, the following modification example can be considered.

Although the embodiment describes the means which determines whether or not parcels are the same between first recognition region Rr1 and second recognition region Rr2, it is possible to determine whether or not parcels passing through a recognition region of label reader 10 and first recognition region Rr1, between the recognition region of label reader 10 which is upstream of first recognition region Rr1 in transport conveyor 50 and first recognition region Rr1 by using the same means are the same. In addition, in a case where they are the same, label recording information read by label reader 10 can be associated with the parcel passing through first recognition region Rr1.

In the embodiment described above, it is detected that parcel P leaves first recognition region Rr1 at a center of the out-region of first recognition region Rr1, and parcel P enters second recognition region Rr2 at a center of the in-region of second recognition region Rr2, but the embodiment is not limited thereto. The detection may be performed in a region other than the center of each region. Meanwhile, parcel P can be detected stably by using the center of each region.

In the embodiment described above, parcel P is recognized based on an image, but the embodiment is not limited thereto. For example, if an IC tag is provided in parcel P and readers are provided in the in-region and the out-region of each recognition region, it is possible to recognize an input and an output of parcel P into and from the recognition region by a method other than the image.

In the embodiment described above, the same parcel is determined by comparing position information $P_{OUT}'$ when leaving first recognition region Rr1 and position information $P_{OUT}$ stored in memory 36, but the embodiment is not limited thereto. In a case where the number of parcels P which can be recognized at the same time is small, it is possible to determine whether or not the parcels are the same based on only time information. As a specific example of such a situation, there may be a case where parcel transported by transport conveyor 50 is small, or a case where a width of transport conveyor 50 is narrow and the number of parcels which can pass through a recognition region is small.

In the embodiment described above, it is determined whether or not parcels P are the same parcel by calculating the time when leaving first recognition region Rr1, but the embodiment is not limited thereto. An entry time of second recognition region Rr2 may be calculated based on a time of leaving first recognition region Rr1, distance L between recognition regions, and a transport speed of parcel P. In this case, it is determined that parcel P detected to enter second recognition region Rr2 in the calculated entry time is the same parcel as parcel P which leaves first recognition region Rr1. In the determination for the same parcel, position information may be further used as in the embodiment described above, or position information may not be used as in the modification example described above. Such contents are illustrated in the drawings and equations as follows.

Figure 8:
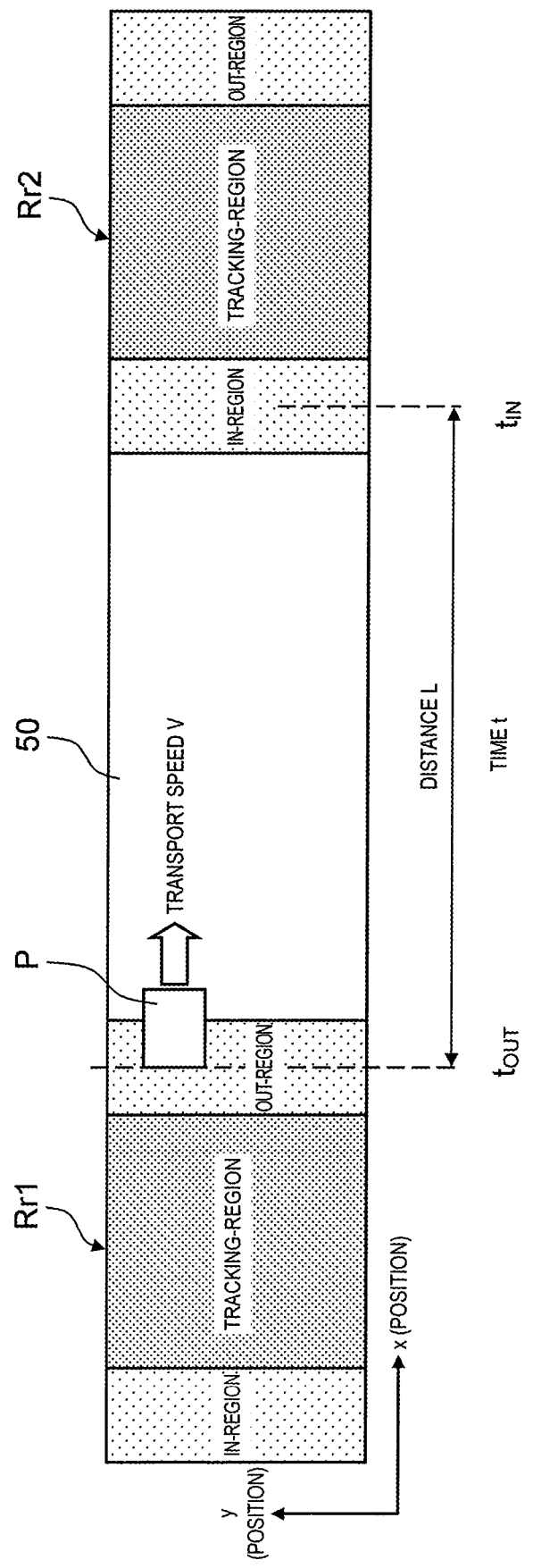
FIG. 8 is a diagram illustrating another recognition and tracking process in a case of two discontinuous recognition regions.

FIG. 8 is a diagram illustrating another recognition and tracking process in a case of two discontinuous recognition regions. In FIG. 8, processor 34 stores distance L between recognition regions and transport speed V of transport conveyor 50 in memory 36. When detecting that parcel P leaves first recognition region Rr1, processor 34 calculates entry time $t_{IN}$ when entering second recognition region Rr2, based on time $T_{OUT}$ at that time, stored distance L between recognition regions and transport speed V of transport conveyor 50. That is, since it is possible to calculate passage time t from first recognition region Rr1 to second recognition region Rr2 based on distance L between recognition regions and transport speed V of transport conveyor 50, it is possible to calculate entry time $t_{IN}$ when entering second recognition region Rr2 from passage time t and time $t_{OUT}$ when parcel P leaves first recognition region Rr1.

For example, processor 34 also calculates a predicted position of parcel P after passage time t. The predicted position of parcel P after passage time t can be expressed by Equation (1).

$$(x_1+L, y_1) = (x_1+Vt, y_1) \tag{1}$$

The left side indicates an actual position, and the right side indicates a predicted position.

If an actual position of parcel P at entry time $t_{IN}$ when parcel P enters second recognition region Rr2 is the same as a predicted position, processor 34 determines that parcel P detected to enter second recognition region Rr2 at calculated entry time $t_{IN}$ is the same as parcel P which leaves first recognition region Rr1.

In the embodiment described above, it is determined whether or not parcels P are the same parcel by calculating the time when leaving first recognition region Rr1, but the embodiment is not limited thereto. After comparing an order of parcel which leaves first recognition region Rr1 with an order of parcel which enters second recognition region Rr2 and narrowing down the same parcels to some extent, it may be determined whether or not parcels P are the same parcel by calculating a time when leaving first recognition region Rr1 as described in the embodiment. For example, in a case where parcel P2 leaves recognition region Rr2 after parcel P1 leaves recognition region Rr1, it is determined that the parcel which enters recognition region Rr2 first is determined as parcel P1, and the parcel which enters next is parcel P2. A speed of the parcel may be unexpectedly increased or decreased due to factors such as accidental touching of a person between regions, but even in such a case, a possibility of switching between transport orders of the parcel is relatively low. Therefore, by determining whether or not parcels are the same based on orders of the parcels, the parcel can be tracked more accurately even under such a situation. In addition, in the configuration in which it is determined whether or not parcels P are the same only based on an order of the parcel, there is a possibility that an erroneous determination is performed when new parcel is added or removed between regions. Therefore, determination based on a time and determination based on an order as in the embodiment described above may be used in combination. There are various procedures for using both determinations in combination. For example, at first, as described above, by calculating a time when leaving first recognition region Rr1 and then, comparing an order of parcel which leaves first recognition region Rr1 and an order of parcel which enters second recognition region Rr2, it may be determined whether or not parcels P are the same. In addition, it may be determined that one piece of parcel is specified according to the time, and another piece of parcel is specified in the order compared with the specified parcel. Further, when the determination result based on the time is different from the determination result based on the order, it may be warned or notified that there is a possibility of an inaccurate determination result. As an order which is a reference of the determination, an order of recognizing parcel with a sensor in first recognition region Rr1 may be used instead of an order of parcel which leaves first recognition region Rr1.

In the embodiment described above, a time when leaving first recognition region Rr1 is calculated based on an entry time of second recognition region Rr2, distance L between two recognition regions, and a transport speed of parcel P, for each parcel P, but the embodiment is not limited thereto. As long as there is no change in the transport speed of parcel P and distance L, a time required for parcel P to move by distance L does not change. Therefore, this time is once calculated and recorded in memory 36, and then, it is also possible to calculate a time of leaving first recognition region Rr1 by subtracting the recorded time from the entry time of second recognition region Rr2. In the same manner, in the modification example in which an entry time of second recognition region Rr2 described above is calculated, a time required for movement can be calculated and recorded in advance and reused.

In the embodiment described above, a speed of transport conveyor 50 is used as a transport speed of parcel P, but the embodiment is not limited thereto. For example, in a case where parcel P on transport conveyor 50 is stopped when parcel P exists between first recognition region Rr1 and second recognition region Rr2, it is assumed that an actual transport speed of parcel P is deviated from the speed of the transport conveyor, or the transport speed of each parcel P varies. In this case, by actually measuring the transport speed of each parcel P and managing the speed for each parcel P, parcel P can be tracked more accurately. The transport speed of parcel P can be obtained by using a tracking result of each parcel P in a tracking region, for example.

The embodiment describes the means which determines whether or not parcels are the same between first recognition region Rr1 and second recognition region Rr2 based on information on only a traveling direction of transport conveyor 50. In addition to this, it may be determined whether or not parcels are the same, by using coordinate values on a conveyor surface in a direction perpendicular to a traveling direction of transport conveyor 50 in first recognition region Rr1 and second recognition region Rr2. For example, in a case where two parcels are transported on transport conveyor 50 in parallel, each parcel cannot be identified only by a coordinate value in a direction parallel to the traveling direction of transport conveyor 50. Therefore, in a case of two parcels to be transported, by comparing coordinate values on a conveyor surface in a direction perpendicular to a traveling direction of transport conveyor 50 between first recognition region Rr1 and second recognition region Rr2, it is possible to determine whether or not the parcels are the same. In this case, for each parcel, coordinate values in a direction perpendicular to a traveling direction may be directly compared, or positional relationships in the direction perpendicular to the traveling direction may be compared. In a case where the coordinate values are directly compared, it can be determined whether or not the parcels are the same even if parcel is added or removed between first recognition region Rr1 and second recognition region Rr2. In a case where the positional relationships are compared, it can be determined whether or not the parcels are the same even if a position of parcel is slightly deviated between first recognition region Rr1 and second recognition region Rr2.

In the embodiment described above, distance L is known, but the embodiment is not limited thereto. In some cases, depending on an environment in which transport conveyor 50 is installed, it is difficult to know distance L in advance such as a case where a shape of transport conveyor 50 is complicated or a case where it is difficult to install transport conveyor 50 for a long period of time and it is necessary to move or deform transport conveyor 50 as needed. In this case, distance L may be calculated by using an actual measurement result obtained by transporting and actually measuring parcel P for actual measurement on transport conveyor 50. For example, if a speed of transport conveyor 50 is known, distance L can be calculated by transporting parcel P for actual measurement on transport conveyor 50 and multiplying the speed of transport conveyor 50 by a difference between a time when leaving first recognition region Rr1 and an entry time of second recognition region Rr2. In this case, since distance L calculated based on parcel P for actual measurement also affects tracking accuracy of other parcel P, it is desirable to use parcel P for actual measurement provided with a marker or the like difficult to be lost recognition. In addition, parcel P for actual measurement does not need to be a target to be sorted by a worker and does not need to have a shape as parcel. For example, the marker itself may be used as parcel P for actual measurement.

Even in a case where distance L is known and a speed of parcel P is unknown, in the same manner, the speed can be calculated by transporting parcel P for actual measurement and dividing distance L by a difference between a time when leaving first recognition region Rr1 and an entry time of second recognition region Rr2. Further, when distance L or a speed is unstable, parcel P for actual measurement may be transported periodically, and distance L or the transport speed of parcel P may be corrected as needed based on the result.

In the embodiment described above, transport speeds of parcel P may be different in a recognition region and outside the recognition region. For example, in a case where there is no reason to suppress the transport speed, such as a case where there is no worker between first recognition region Rr1 and second recognition region Rr2, it is efficient to transport parcel P at a high speed outside the recognition region. Such a configuration in which the speed of parcel P is increased in a part of the speed can be realized by connecting plurality of transport conveyors 50 having different speeds. Meanwhile, in this case, when calculating a time when leaving first recognition region Rr1, it is necessary to use a high transport speed between the recognition regions. In this case, if a speed of transport conveyor 50 and a speed of parcel P coincide with each other between recognition regions, the speed of transport conveyor 50 between the recognition regions may be used as the speed of parcel P. Further, in a case where there is a possibility that the speed of transport conveyor 50 and the speed of parcel P do not coincide with each other, or in a case where it is difficult to obtain information between the recognition regions, calculation may be performed by transporting parcel P for actual measurement provided with a marker or the like as in the other modification example described above.

In the embodiment described above, for convenience of description, transport conveyor 50 is assumed to be linear. Meanwhile, transport conveyor 50 may include a curved portion due to a circumstance such as restrictions on an installation location of transport conveyor 50. In this case, since distance L by which parcel P moves is longer on an outer periphery than on an inner periphery of the curved portion, depending on which part of transport conveyor 50 parcel P moves, it is desirable to provide a difference in at least one of a calculation procedure of the time and a determination reference when leaving first recognition region Rr1. As an example of modifying the calculation procedure, it is conceivable to use different distance L depending on a checked position of parcel P on transport conveyor 50. In addition, as an example of modifying the determination reference, it is conceivable to use a difference of times permitted as an error depending on the checked position of parcel P on transport conveyor 50. At least one of distance L and the permissible error can be obtained by measuring or setting at a time of installing transport conveyor 50 or by actually transporting parcel P for actual measurement provided with a marker or the like on transport conveyor 50 in operation as described in the modification example.

INDUSTRIAL APPLICABILITY

The present disclosure is useful to provide a parcel determination device, a parcel sorting system, and a parcel determination method capable of, in a case where a plurality of recognition regions are set in a transport direction of parcel, even if there are two discontinuous recognition regions, determining whether or not parcel recognized in an upstream recognition region and parcel recognized in a downstream recognition region in these recognition regions are the same.

REFERENCE MARKS IN THE DRAWINGS

10 LABEL READER
20 IMAGE SENSOR
22 DISTANCE IMAGE SENSOR
24 COLOR IMAGE SENSOR
30 PROJECTION INSTRUCTION DEVICE
32 INPUT UNIT
34 PROCESSOR
36 MEMORY
38 OUTPUT UNIT
40 PROJECTOR
50 TRANSPORT CONVEYOR
60 IMAGING PROJECTION DEVICE
100 PARCEL SORTING SYSTEM
P PARCEL

The invention claimed is:

1. A parcel determination device that determines whether or not a first parcel recognized in a first recognition region provided in a predetermined transport path and a second parcel recognized in a second recognition region being disposed on a downstream side from the first recognition region in the transport path and being discontinuous with the first recognition region are a same parcel, the parcel determination device comprising:
    a processor; and
    a memory,
    wherein by cooperating with the memory,
        the processor determines whether or not the first parcel which leaves the first recognition region and the second parcel which enters the second recognition region are the same parcel, based on whether or not a first time when the first parcel leaves the first recognition region and a second time when the second parcel enters the second recognition region correspond to a third time required for a parcel to be transported between the first and second recognition regions, and
    wherein the processor tracks the first parcel as a new parcel in the second recognition region, when the processor determines the first parcel which leaves the first recognition region and the second parcel which enters the second recognition region are not the same parcel.

2. The parcel determination device of claim 1,
wherein the processor
    stores the first time when the first parcel leaves the first recognition region in advance,
    calculates a time when the first parcel leaves the first recognition region from the second time when the second parcel enters the second recognition region and the third time required for the parcel to be transported between the first and second recognition regions, and
    determines whether or not the first parcel which leaves the first recognition region and the second parcel which enters the second recognition region are the same parcel, based on the stored first time and the calculated time.

3. The parcel determination device of claim 2,
wherein the processor further
    stores a position at which the first parcel leaves the first recognition region in advance,
    calculates a position when the first parcel leaves the first recognition region from a position of the second parcel in the second recognition region based on the calculated time,
    compares the calculated position with the position stored in advance, and
    determines whether or not the first parcel which leaves the first recognition region and the second parcel which enters the second recognition region are the same parcel, based on the stored first time, the calculated time, and a comparison result of the positions.

4. The parcel determination device of claim 1, wherein the processor
calculates a time when the second parcel enters the second recognition region from the first time when the first parcel leaves the first recognition region and the third time required for the parcel to be transported between the first and second recognition regions, and
determines whether or not the first parcel which leaves the first recognition region and the second parcel which enters the second recognition region are the same parcel, based on the calculated time and the second time when the second parcel enters the second recognition region.

5. The parcel determination device of claim 4, wherein the processor further
calculates a position at which the second parcel enters the second recognition region based on the calculated time,
compares the calculated position with a position at which the second parcel enters the second recognition region, and
determines whether or not the first parcel which leaves the first recognition region and the second parcel which enters the second recognition region are the same parcel, based on the calculated time, the second time when the second parcel enters the second recognition region, and a comparison result of the positions.

6. The parcel determination device of claim 1, wherein the processor calculates the third time required for the parcel to be transported between the first and second recognition regions by using a transport speed of the parcel and a distance between the first and second recognition regions.

7. The parcel determination device of claim 6, wherein the transport path is a transport conveyor, and a transport speed of the parcel is a speed of the transport conveyor.

8. The parcel determination device of claim 6, wherein a transport speed of the parcel is a speed calculated based on a result of transporting a parcel recognizable as the same parcel in both of the first recognition region and the second recognition region on the transport path.

9. The parcel determination device of claim 6, wherein the distance between the first and second recognition regions is calculated based on a result of transporting a parcel recognizable as the same parcel in both of the first recognition region and the second recognition region on the transport path.

10. The parcel determination device of claim 1, wherein the processor further
determines whether or not each of a first plurality of parcels which leave the first recognition region and each of a second plurality of parcels which enter the second recognition region are same parcels, based on whether or not an order of the first plurality of parcels which leave the first recognition region corresponds to an order of the second plurality of parcels which enter the second recognition region.

11. The parcel determination device of claim 1, wherein the processor further
determines whether or not the first parcel which leaves the first recognition region and the second parcel which enters the second recognition region are the same parcel, based on whether or not first coordinates of the first parcel in a first direction approximately perpendicular to a first transport direction in the first recognition region correspond to second coordinates of the second parcel in a second direction approximately perpendicular to a second transport direction in the second recognition region.

12. The parcel determination device of claim 11, wherein the processor further
determines whether or not each of a first plurality of parcels which leave the first recognition region and each of a second plurality of parcels which enter the second recognition region are same parcels, based on a first positional relationship of the first plurality of parcels in the first direction approximately perpendicular to the first transport direction in the first recognition region and a second positional relationship of the second plurality of parcels in the second direction approximately perpendicular to the second transport direction in the second recognition region.

13. The parcel determination device of claim 1, wherein each of the first recognition region and the second recognition region includes an in-region in which parcels enter, an out-region from which the parcels leave, and a tracking-region which is disposed between the in-region and the out-region and in which the parcels are tracked.

14. A parcel sorting system comprising:
a projection instruction device including the parcel determination device of claim 1;
a label reader which reads parcel identification information from a label attached to a parcel;
a plurality of image sensors which obtain an image including the parcel; and
an image projection device which projects a projection image indicating a sorting destination on the parcel.

15. A parcel determination method of determining whether or not a first parcel recognized in a first recognition region provided along a predetermined transport path and a second parcel recognized in a second recognition region disposed on a downstream side from the first recognition region along the transport path and discontinuous with the first recognition region are a same parcel, the parcel determination method comprising:
by causing a processor to cooperate with a memory,
determining whether or not the first parcel which leaves the first recognition region and the second parcel which enters the second recognition region are the same parcel, based on whether or not a first time when the first parcel leaves the first recognition region and a second time when the second parcel enters the second recognition region correspond to a third time required for a parcel to be transported between the first and second recognition regions; and
tracking the first parcel as a new parcel in the second recognition region, when the processor determines the first parcel which leaves the first recognition region and the second parcel which enters the second recognition region are not the same parcel.

16. A parcel determination device that determines whether or not a first parcel recognized in a first recognition region provided in a predetermined transport path and a second parcel recognized in a second recognition region being disposed on a downstream side from the first recognition region in the transport path and being discontinuous with the first recognition region are a same parcel, the parcel determination device comprising:
- a processor; and
- a memory,
- wherein by cooperating with the memory,
  - the processor determines whether or not the first parcel which leaves the first recognition region and the second parcel which enters the second recognition region are the same parcel, based on whether or not a first time when the first parcel leaves the first recognition region and a second time when the second parcel enters the second recognition region correspond to a third time required for a parcel to be transported between the first and second recognition regions, and
  - the processor further determines whether or not the first parcel which leaves the first recognition region and the second parcel which enters the second recognition region are the same parcel, based on a first positional relationship of a first plurality of parcels, including the first parcel, in a first direction approximately perpendicular to a first transport direction in the first recognition region and a second positional relationship of a second plurality of parcels, including the second parcel, in a second direction approximately perpendicular to a second transport direction in the second recognition region.

* * * * *